United States Patent [19]
Gilligan et al.

[11] Patent Number: 5,133,682
[45] Date of Patent: Jul. 28, 1992

[54] METHOD AND MOLD FOR FABRICATING AN ARC TUBE FOR AN ARC DISCHARGE LAMP

[75] Inventors: Thomas J. Gilligan, Salisbury; George J. English; Harold L. Hough, Beverly, all of Mass.

[73] Assignee: GTE Products Corporation, Danvers, Mass.

[21] Appl. No.: 608,421

[22] Filed: Nov. 2, 1990

[51] Int. Cl.⁵ .............................. H01J 9/32
[52] U.S. Cl. ...................... 445/26; 445/39; 445/43; 65/55; 65/59.26
[58] Field of Search ............... 445/26, 43, 39, 67, 445/41; 65/277, 79, 229, 230, 46, 59.26, 110, 55

[56] References Cited

U.S. PATENT DOCUMENTS

| | | | |
|---|---|---|---|
| 3,305,289 | 2/1967 | Fridrich | 445/26 X |
| 3,685,880 | 8/1972 | Sobieski | 445/42 |
| 4,389,201 | 6/1983 | Hansler et al. | 445/26 |
| 4,434,386 | 2/1984 | Lowe | 445/22 X |
| 4,540,373 | 9/1985 | Rothwell et al. | 445/22 |
| 5,008,592 | 4/1991 | Pragt | 445/27 |

Primary Examiner—Kenneth J. Ramsey
Attorney, Agent, or Firm—William E. Meyer

[57] ABSTRACT

A method of fabricating an arc discharge capsule from a tubular blank, and a mold used in such fabrication, is provided wherein a first electrode is sealed in a first press seal in one end of the blank, and a preform designed to facilitate insertion and positioning of a second electrode is formed in an opposite end of the blank, in a single pressing and blowing step.

14 Claims, 3 Drawing Sheets

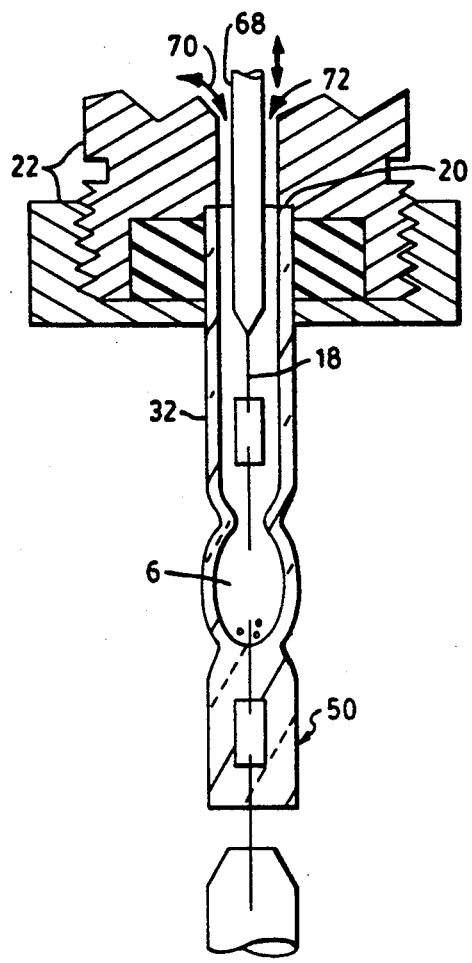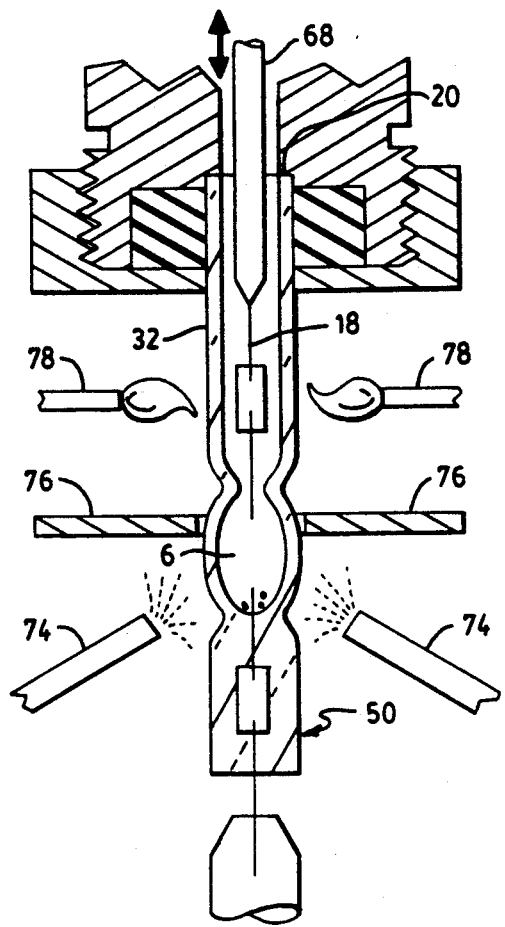
FIG. 5          FIG. 6
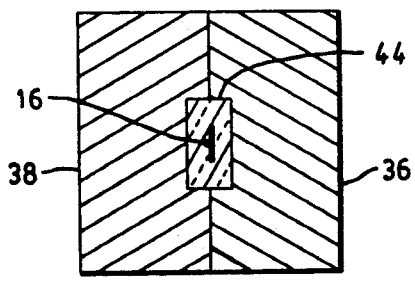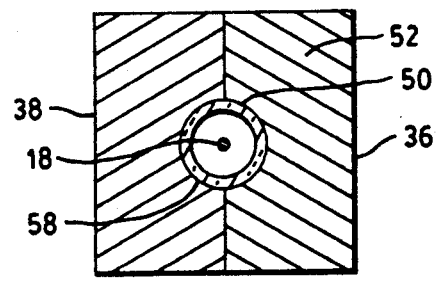
FIG. 7          FIG. 8
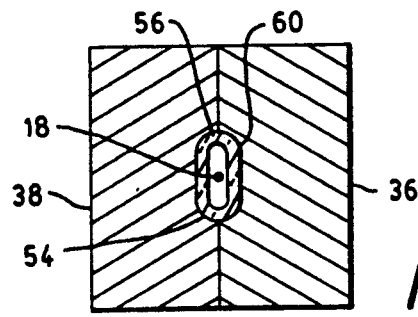
FIG. 9

METHOD AND MOLD FOR FABRICATING AN ARC TUBE FOR AN ARC DISCHARGE LAMP

BACKGROUND OF THE INVENTION

1. Field of the Invention

The invention relates to the fabrication of electric lamps, and in particular to the fabrication of capsules for use in arc discharge lamps. Although the invention is applicable to arc discharge lamp tubes of any size, it is particularly useful to low wattage lamps.

2. Description of the Prior Art

Although relatively expensive to manufacture, metal halide arc discharge lamps are becoming increasingly popular due to their superior light output and long life compared to incandescent lamps. Metal halide lamps generally include an outer sealed envelope and an inner arc discharge capsule. The arc discharge capsule is electrically connected at one end of a pair of electrical connectors which are then sealed through the outer envelope. The exterior ends of electrical connectors are electrically connected to a lamp base attached to the exterior of the outer envelope.

Typically, the fabrication of an arc discharge capsule for a metal halide lamp includes a series of separate steps. For example, one known method includes the following steps: (1) Starting with a quartz tube five inches long, one end is heat sealed. (2) The tube, with the open end up, is then loaded in a vertical lathe chuck. (3) The tube is rotated in the lathe and heated near the sealed end to its working temperature. (4) The molten glass is captured in a two-part mold and nitrogen is blown into the tube through the open end. The positive pressure causes the heated glass tube to fill the mold to form a blown capsule. (5) The blown capsule is trimmed to length. (6) The capsule is acid-washed, dried and vacuum-baked to reduce possible contamination. (7) An electrode assembly is sealed into one end of the capsule. (8) An exhaust tube is sealed onto the body of the capsule. (9) A second electrode assembly is sealed into the opposite end of the capsule. (10) The capsule is again acid-washed, dried and vacuum-baked. (11) The capsule is then exhausted and filled with a metal halide lamp fill through the exhaust tube. (12) The lamp capsule is finally tipped off to seal in the lamp fill.

As is readily apparent from the number of individual steps involved, the cost of manufacturing such a lamp capsule is high. There are numerous chances for contaminants to be introduced into the process, hence the need for the washing, drying and baking steps during the course of fabrication.

Use of metal halide lamps in areas requiring high reliability, and miniaturization, such as the auto industry, has intensified the need to avoid the long and costly manufacture process. In addition, new problems have arisen. For example, accurate positioning of the electrodes is more critical, especially in anode placement for direct current lamp designs. Further, a more uniformly shaped volume and a tipless lamp capsule are preferred features to avoid degradation of the optical qualities. All of these features are particularly difficult to achieve in small arc discharge lamps, for example those having a volume less than half a milliliter.

The prior art has addressed some of these problems For example, U.S. Pat. No. 4,540,373 to Rothwell et al., which issued on Sep. 10, 1985, and is assigned to the same assignee as the invention deals primarily with maintaining precise electrode alignment during formation of the press seals.

In U.S. Pat. No. 3,419,947 to Gottschalk et al., which issued on Jan. 7, 1969, electrode alignment is effected by maintaining the two electrodes in engagement during assembly and sealing, and then softening the lamp to allow the electrodes to be disengaged and adjusted to the desired spacing.

In U.S. Pat. 3,939,538 to Hellman et al., which issued on Feb. 24, 1976, a press mold is provided for the ends of an arc lamp tube, which facilitates electrode placement and improves color uniformity, but at the cost of a complex fabrication process.

Several fabrication steps are combined in U.S. Pat. No. 3,685,880 to Sobieski, which issued on Aug. 22, 1972. In this patent both electrodes are assembled into the capsule simultaneously, although this requires precise alignment of the assembly apparatus.

In U.S. Pat. No. 4,389,201 to Hansler et al., which issued on Jun. 21, 1983, further attempts are made at reducing the handling of a lamp during fabrication, but again this reduction comes at the expense of complex equipment and subsequent increased costs.

Similar examples of methods of improving the manufacture of miniature lamps are offered in U.S. Pat. Nos. 4,434,386 and 4,756,701. The former, to Lowe, which issued on Feb. 24, 1984, and is assigned to the same assignee as this invention, combines molding and press sealing operations into a single step by maintaining both electrodes at the same end of the tube. The latter, to Danko et al., which issued on Jul. 12, 1988, describes a method of making an incandescent capsule which is quite similar to the standard procedure noted above, but the cleaning steps have been eliminated.

There is a need for a fabrication technique which reduces costs by simplifying the manufacturing process, and still address the specific problems encountered in low wattage lamps. There is also a need to provide a fabrication technique which provides a means of positioning electrodes in an capsule in a repeatable manner. It is also desirable to provide a lamp capsule having a more uniformly shaped volume and one which is tipless. It is also desirable to achieve these features in a small volume arc discharge lamp.

SUMMARY OF THE INVENTION

Small arc discharge lamps may be formed from a tubular blank having a circular cross section. The capsule includes an elongated body, a bulbous midsection hermetically enclosing an interior volume, and two opposed ends adjacent to the midsection. Each of the ends has a hermetic seal formed therein and an electrode mounted in each seal. Each electrode means protrudes into the interior of the bulbous midsection. The fabrication method comprises the steps of loading a first end of the blank over a first electrode means and heating the blank to pliability while flowing an inert gas through the blank to prevent electrode oxidation. The blank is then pressed and blow molded while blowing into a second end of the blank. The press molding (1) forms a first press seal at the first end thereby mounting the first electrode means in the first press seal; (2) forms the bulbous midsection; and (3) preforms the second end of the blank. The preformed second end may include a first region adjacent the bulbous midsection which has a first cross section configured for guiding a second electrode in the bulbous midsection, and a second region adjacent the first region and having a second cross section configured for guiding a foil of the second electrode end relative to the second end of the blank. The preformed second end may also nearly approximate the final second seal configuration. The bulbous midsection is then filled with a portion of the lamp fill and the second electrode end is finally positioned in the second end, the foil of the second electrode end being oriented relative to the first electrode, and envelope. A final gas fill is added into the bulbous midsection. The final step is to form a second hermetic seal at the second end thereby mounting the second electrode end in the second hermetic seal.

BRIEF DESCRIPTION OF THE DRAWINGS

FIG. 5 is a diagrammatic representation of a fourth step of the method for making an arc lamp;

FIG. 6 is a diagrammatic representation of a fifth step of the method for making an arc lamp;

FIG. 7 is a view taken along lines 7—7 of FIG. 3;

FIG. 8 is a view taken along lines 8—8 of FIG. 3 with an electrode cross section added for comparison;

FIG. 9 is a view taken along lines 9—9 of FIG. 3 with an electrode cross section added for comparison;

DESCRIPTION OF THE PREFERRED EMBODIMENT

Figure 1:
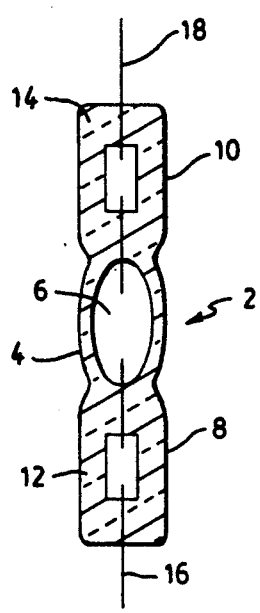
FIG. 1 is an arc discharge capsule formed in accordance with the method of the invention.

A preferred embodiment of the invention is illustrated in the drawings. The method of the invention is directed to the fabrication of an arc discharge capsule 2 having an elongated body including a bulbous midsection 4, which hermetically encloses an interior 6, and two opposed ends 8 and 10 adjacent the midsection 4. First end 8 includes a first hermetic press seal 12, while the second end 10 includes a second hermetic seal 14, that may be vacuum or press formed. Mounted in press seal 12 is a first electrode 16, and mounted in the second seal 14 is a second electrode 18. The two electrodes 16, 18 protrude into the interior 6. In addition, an electric arc generating and sustaining lamp fill is provided in interior 6.

Figure 2:
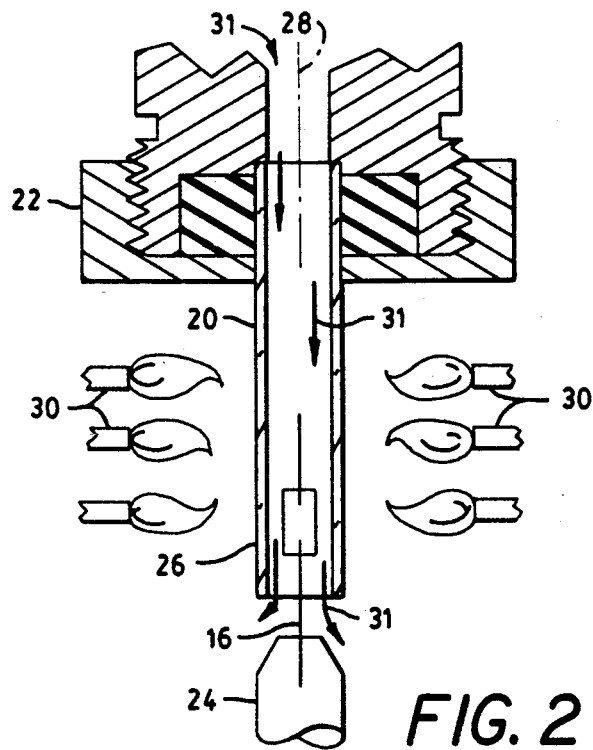
FIG. 2 is a diagrammatic representation of a first step of the method for making an arc lamp.

The procedure embodying the invention divides the fabrication of arc discharge capsule 2 into a reduced number of steps as diagrammatically depicted in the drawings. Referring to FIG. 2, in the first step a tubular blank 20 having a circular cross section is loaded over the first electrode 16. In particular, the blank 20 is mounted in a sealing head 22 and the first electrode 16 is mounted in an opposite lower chuck 24. As depicted in FIG. 2, positioned over the first electrode 16 is a first end 26 of the blank 20 in such a manner the first electrode 16 extends into the tubular blank 20 along the axis 28 thereof and is positioned in the tubular blank 20 a sufficient distance along axis 28 such that when the first press seal 12 is made, the first electrode 16 is positioned relative to such first press seal 12 as desired. After the first electrode 16 is positioned in the first end 26 of the blank 20, the blank 20 is heated to pliability, the arrows 30 signifying the application of heat in a conventional manner. A flow of inert gas, for example, argon, from the vacuum head 22 is simultaneously passed through the blank 20 and out around the lower chuck 24.

Figure 3:
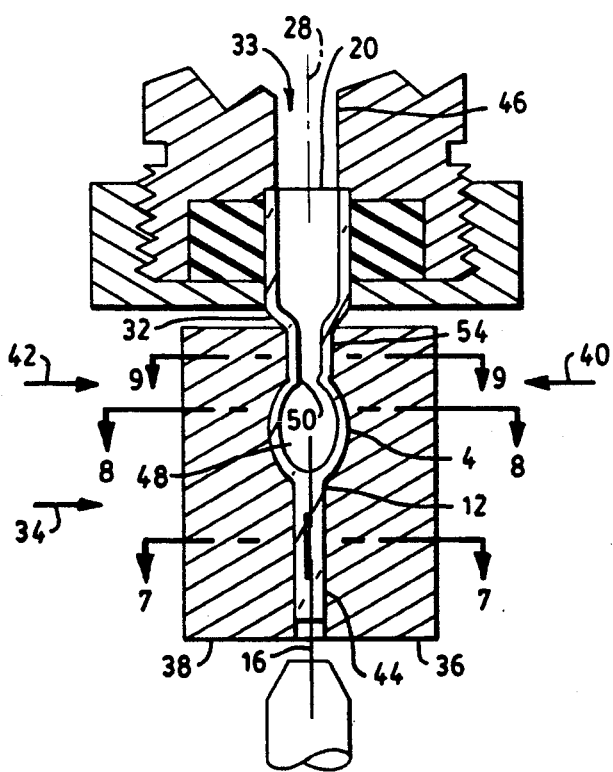
FIG. 3 is a diagrammatic representation of a second step of the method for making an arc lamp.

The next step is depicted in FIG. 3 and involves pressing the blank 20 and simultaneously or closely in time thereafter, blowing into a second end 32 thereof with a pressure gas 33. In particular, the blank 20 is pressed by a mold 34. The preferred mold 34 includes a first half in the form of the first mold section 36 and an opposite second half in the form of the second mold section 38. The first mold section 36 is preferably a mirrored by the second mold section 38. Each half of the mold 34 then comprises substantially identical mold cavities which collectively form the whole mold cavity. The mold may take numerous forms, each of which produce lamps with specific advantages. For example, the tear shaped form shown is currently preferred by the Applicants for use in some direct current lamp designs. For alternating current lamps, a long lamp life and high lumen output may be achieved with an elliptical shape, while, a tubular form may be used for fast warm up lamps. The mold may also be formed to include heat conduction controls, mechanical couplings or other such protrusions, or indentations as may be elected by the lamp designer, as is generally known in the art.

Generally, the pliable blank 20 may be pressed by the first mold section 36, and the opposite second mold section 38, moved in directions normal to axis 28. For example, to press the pliable blank 20 mold sections 36 and 38 may be moved in the direction of arrows 40 and 42, respectively. The simultaneous, or sequentially close in time, pressing and blowing of the pliable blank 20 forms the blank 20 into a nearly complete lamp capsule configuration. The second end 10 is preferably only left sufficiently open to allow the second electrode 18, the lamp fill and fill gases to be properly positioned in the blank 20. The preferred pressed and blown blank 20 then has a second end 10 approximately in final form, whereby the envelope material of the second end 10 needs only minimal movement to complete the second seal 14. Minimal movement of the second end 10 material to form the second seal 14 means the second electrode 18 is less likely to drift from its initial positioning when the second seal 14 is heated and formed.

During the pressing step depicted in FIG. 3, the first press seal 12 is formed at the first end 26 of the blank 20 thereby mounting the first electrical connection for the lamp capsule 2, such as the first electrode 16 in the first press seal 12. The mold 34 includes a first press seal mold cavity 44 the preferred cross section of which is depicted in FIG. 7. Each half of the preferred mold 34 further includes substantially identical mold cavities which collectively define a whole mold cavity 44 for the first press seal 12. The mold cavity 44 is configured to press the pliable quartz first end 26 and form a hermetic seal between the glass or quartz and metal electrode, and metal foil as depicted in FIG. 7. The configuration of the first press seal 12 is formed to conform the heated blank 20 into the desired form for the final lamp capsule.

During the pressing step depicted in FIG. 3, gas 33 is blown into the blank 20 by means of conduit 46 in the sealing head 22, the conduit 46 being coupled to a gas source (not shown). The combination of pressing together the mold sections 36 and 38 and blowing gas into the blank 20 by means of conduit 46 forms the bulbous midsection 4 of the arc discharge capsule 2. The bulbous midsection 4 is formed by providing a corresponding bulbous cavity 48 in the mold 34, each mold section 36 and 38 comprising one half of such bulbous cavity 48.

In the preferred procedure, in addition to forming the bulbous midsection 4 and the first press seal 12 by pressing mold sections 36 and 38 together and blowing gas into the blank 20, the process may further partially form the second seal 14. In one alternative, the preformed second end 32 may then be separately finished in a subsequent pressing, to complete the lamp capsule 2 by known steps. The preferred partial formation of the second hermetic seal 14 includes forming a neck region 50 adjacent the bulbous midsection 4 which may include a cross section 52 (see FIG. 8 for cross section) configured for guiding an electrode tip of the second electrode 18 into the bulbous midsection 4, and a flattened region 54 adjacent the neck region 50 and having a cross section 56 (see FIG. 9 for cross section) configured for rotationally guiding a sealing foil of the second electrode 18 into the blank 20. Each half of the mold 34 comprises identical mold cavities which collectively form the mold cavities 58 and 60. The mold cavity 58 is generally configured to press the pliable glass or quartz second end 32 and form the neck region 50. The neck region 50 is configured to guide an electrode tip of the second electrode 18 into the interior 6 the blank 20. In a preferred embodiment the mold cavity 58 includes a portion approximately complementary with but offset from the cross section of the second electrode 18. Preferably, the diameter of the mold's cross section is as small as possible yet sufficient to provide an aperture in the neck region 50 through which the electrode tip of the second electrode 18 may be inserted, as depicted in FIG. 8.

Similarly, the mold cavity 60 may be configured to press the pliable glass or quartz end 32, and form the flattened region 54 to guide a foil of the second electrode 18 into the blank 20 relative to the second end of the blank 20. Once the press blowing is complete, the mold halves 36, 38 may be removed.

Figure 4:
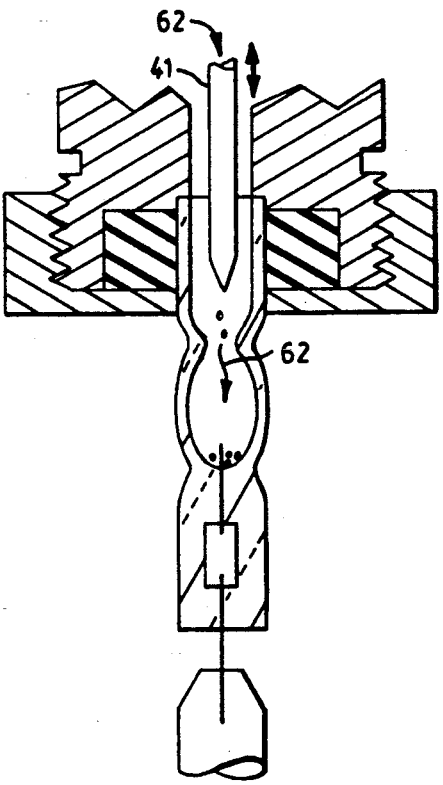
FIG. 4 is a diagrammatic representation of a third step of the method for making an arc lamp.
Figure 10:
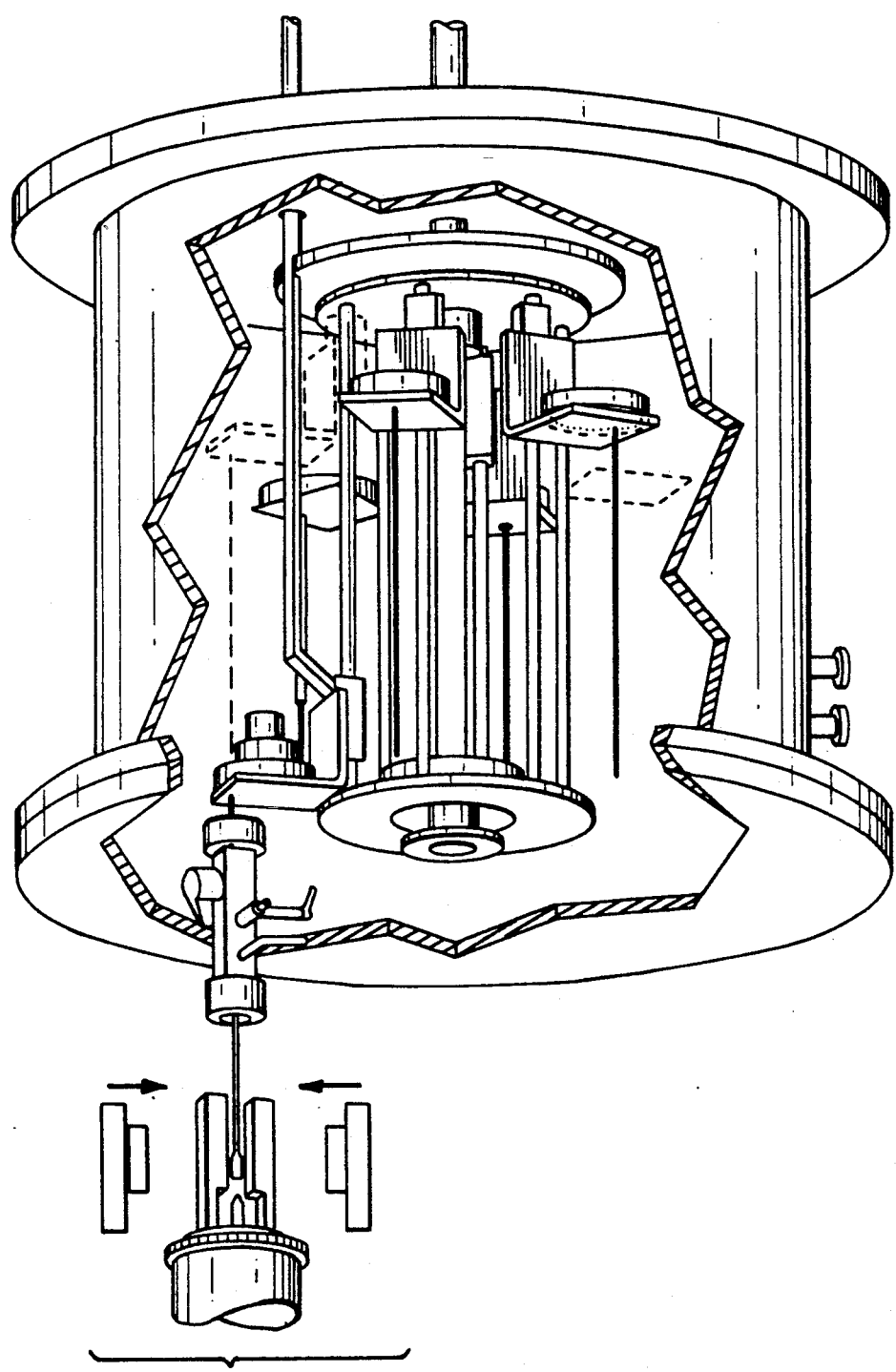
FIG. 10 is a diagrammatic representation of a carrousel gas chamber used in the lamp manufacture.

The next step is depicted in FIG. 4 and involves dosing the bulbous midsection 4 with a portion of the particular lamp fill being used. While it is possible to remove the sealing the blank 20, and add the proper amount of the particular lamp fill, removal allows possible contamination of the enclosed volume 6. The preferred method is to leave the partially formed blank 20 in the sealing head 22, and insert the lamp fill in the enclosed volume by a needle that threads down through conduit 46 to the upper end of the blank 20. Ordinarily, a blank 20 is acid washed, and baked, before adding the lamp fill. Applicants have avoided these steps. The Applicants have designed a gas sealed containment vessel positioned above the sealing head that includes a carrousel of needles that may be extended into the blank 20. At necessary stages, the carrousel is rotated and the next needle is axially aligned with, and then advanced into the blank 20 to introduce a flush or fill gas, a lamp fill pellet, or the second electrode, as the case may be.

FIG. 5 shows the next step. The second electrode 18 is held by a needle 68, and inserted into the blank 20. During insertion of the second electrode 18, the electrode shaft and foil, may be oriented relative to the neck region 50 and the flattened region 54, respectively, by mating therewith as depicted in FIGS. 8 and 9. The second electrode 18 and blank 20 may then coact to align the electrode 18 in the partially formed second seal end 32. The preferred method is to allow the inside surfaces of the preformed seal end to assist in rotationally aligning, and centering the second electrode 18. The proper gap distance from the first electrode 16 to the second electrode 18 is positively set by the vertical positioning of the insertion needle 68. When the second electrode 18 is inserted in the blank 20 as depicted in FIG. 5, the second electrode 18 moves along the axis 28 in a downward direction until the desired arc gap is achieved. Alternatively, where the second electrode 18 is dropped in the second end 32, the distance the electrode tip of the second electrode 18 extends into the bulbous midsection 4 then depends on the passive positioning of the electrode tip and electrode foil with the neck region 50 and the flattened region 54. A functional, albeit less accurate vertical positioning may be achieved by dropping the electrode 18 and letting the foil of the second electrode 18 be stopped by the upper face of the necked region 50. Theoretically, an accurate positioning could be achieved by dropping the electrode 18 in place if accurate control of the melted glass could be achieved. In any case, the tip of the second electrode 18 extends through the neck region 50 into the defined interior 6.

The next step is also depicted in FIG. 5 and involves adding a final gas fill in the interior 6. In the preferred procedure, to flush any contaminant gases from the interior 6, an inert gas 70 is cyclically pumped in and out of the blank 20 through seal head 22. Subsequently, the blank 20 is also subjected to a high vacuum by means of seal head 22 to remove residual gases. A vacuum valve, not shown, may be closed to maintain a high vacuum in the blank 20. A final gas fill 72 at below atmospheric pressure is then added to the blank 20.

Next, as shown in FIG. 6, the blank 20 is submerged in or sprayed with liquid nitrogen 74 to freeze out any gas in blank 20, the seal head 22, and portions of the gas conduit 46. In the preferred method, a spray shield 76 is positioned around the blank 20. The preferred spray shield 76 comprises two carbon fiber half rings that may be fitted around the capsule. The lower region of the blank 20 is then sprayed with liquid nitrogen 74. The liquid nitrogen 74 condenses the lamp fill, and fill gas causing the lamp fill and fill gas to settle in the bottom of bulbous midsection 4.

The next step is also depicted in FIG. 6 and involves forming the second seal 14 at the second end 32 thereby mounting the second electrode 18 in the second seal 14. Although this sealing step may be varied, in the preferred embodiment the blank 20 is heated in the region of the second seal 14 by applying heat in a manner similar to that used in FIG. 2 to heat the blank 20 along the first end 26. In the preferred method, the region above the spray shield 76 is heated by the rotary burners 78. The burners 78 are vertically indexed, but not rotated for this heating. The second end 32 becomes pliable due to the heat from the rotary burners 78. Meanwhile, the lower end of the blank 20 continues to be sprayed with liquid nitrogen 74. In the bulbous midsection 4, the lamp fill and fill gas remain condensed by the liquid nitrogen 74. The interior of the blank 20 is kept at a lower pressure than the atmospheric, thereby causing a pressure difference induced force on the exterior of the blank 20. The pressure difference collapses the heated upper end of the preformed blank 20 to form the second seal 14. The second electrode 18 is then sealed in the second seal 14, and the lamp fill, and fill gases are captured in the interior 6. In any event, a hermetic seal is formed between the quartz and metal foil of the second electrode 18.

Processing is completed by removing the arc discharge capsule 2 from the seal head 22 and chuck 24. Excess quartz extending from the second end 32 may be trimmed as needed to form the arc discharge capsule 2 of FIG. 1.

In a working example of a preferred lamp made according to the method explained here, some of the dimensions were approximately as follows. The capsule was about 32 millimeters long. The anode seal end was a vacuum seal 5.08 millimeters wide and about 11.5 millimeters long. The anode necked down area was about 1.5 millimeters long, and had an indentation of about 1.0 millimeters. The tubular midsection was about 3.98 millimeters long, with an outside diameter of 5.2 millimeters. The enclosed volume was 7.1 millimeters long and 2.6 millimeters in internal diameter. The cathode necked down region was similar to the first, being about 1.0 millimeters long and having an indentation of about 1.0 millimeters. The cathode sealed end was about 9.5 millimeters long and 6.1 millimeters across.

Sealed in the first seal end was a cathode from a first input wire. The first input wire had a diameter of about 0.51 millimeters. The input wired entered the anode seal end and coupled to a first foil. The first foil had a length of 5.0 millimeters and width of 1.5 millimeters. The first foil was then coupled to a cathode. The cathode electrode extended into the enclosed volume to be exposed by about 1.5 millimeters in the enclosed volume. The opposite electrode, the anode was similarly exposed by about 1.5 millimeters in the enclosed volume. The anode entered the second seal area to couple with a second foil about 1.5 millimeters in width and 5.0 millimeters in length. Coupled to the opposite end of the second foil was a second lead wire with a diameter of about 0.51 millimeters extended. The second lead wire emerged from the second seal to be exposed for electrical connection. The enclosed volume included a fill lamp fill including mercury, sodium, scandium, iodine and about 8 atmospheres of xenon. The disclosed operating conditions, dimensions, configurations and embodiments are as examples only, and other suitable lamp configurations and relations may be used with the invention.

While there have been shown and described what are at present considered to be the preferred embodiments of the invention, it will be apparent to those skilled in the art that various changes and modifications can be made herein without departing from the scope of the invention defined by the appended claims.

What is claimed is:

1. A method of fabricating a lamp capsule from a tubular blank, said blank having a circular cross section, said lamp capsule having an elongated body, a bulbous midsection hermetically enclosing an interior, and two opposed ends adjacent to said midsection, each of said ends having a press seal formed therein and electrical connection means mounted in said press seal, each electrical connection means protruding into said interior for use in producing light, and a lamp fill in said interior, said method comprising the steps of:

(a) loading a first end of said blank over a first electrical connection means;
    (b) sealing a second end of said blank in a sealing head;
    (c) heating, at least said first end of said blank to pliability;
    (d) pressing said blank and blowing into said second end of said blank thereby simultaneously (1) forming a first press seal at said first end thereby mounting said first electrical connection means in said first press seal; (2) forming said bulbous midsection; and (3) sealing said bulbous midsection between said first press seal, and said sealing head from the exterior;
    (e) advancing said second electrical connection means from said sealing head, and positioning said second electrical connection means in said second end;
    (f) adding a final lamp fill into said bulbous midsection; and
    (g) forming a second hermetic seal at said second end thereby mounting said second electrical connection means in said second hermetic seal.

2. The method in claim 1 wherein adding lamp fill is through a space intermediate the blank and the second electrical connection.

3. The method in claim 1 wherein the electrical connection means is a first electrode, and the second electrical connection means is a second electrode for forming an arc discharge therebetween.

4. The method of claim 1, wherein after sealing said first end, and prior to advancing the second electrode, a needle is advanced into the enclosed volume and a flush gas is passed through the needle into the enclosed volume and out around the needle.

5. The method of claim 1, wherein after sealing said first end, and prior to advancing the second electrode, at least one additive is introduced through the second end into the enclosed volume.

6. A method of fabricating a lamp capsule from a tubular blank, said blank having a circular cross section, said lamp capsule having an elongated body, a bulbous midsection hermetically enclosing an interior, and two opposed ends adjacent to said midsection, each of said ends having a press seal formed therein and electrical connection means mounted in said press seal, each electrical connection means protruding into said interior for use in producing light, and a lamp fill in said interior, said method comprising the steps of:

(a) loading a first end of said blank over a first electrical connection means;
    (b) sealing a second end of said blank in a sealing head;
    (c) heating, at least said first end of said blank to pliability;
    (d) pressing said blank and blowing into said second end of said blank thereby simultaneously (1) forming a first press seal at said first end thereby mounting said first electrical connection means in said first press seal; (2) forming said bulbous midsection; and (3) performing said second end of said blank, said preformed end having a first region, adjacent said bulbous midsection, having a first cross section configured for guiding a second electrical connection into said bulbous midsection;
    (e) advancing said second electrical connection means from said sealing head, and positioning said second electrical connection means in said second end, said second electrical connection means being thereby oriented relative to said first region;
    (f) adding a final lamp fill into said bulbous midsection; and (g) forming a second hermetic seal at said second end thereby mounting said second electrical connection means in said second hermetic seal.

7. A method as described in claim 6 wherein said first region of said preformed end has an essentially circular cross section.

8. A method as described in claim 7 wherein said essentially circular cross section has a diameter which is as small as possible yet sufficient to permit insertion of said electrode of said electrode means.

9. A method as described in claim 6 wherein said second region of said preformed end has an essentially elliptical cross section dimensioned to facilitate insertion of said foil of said second electrode means.

10. A method as described in claim 9 wherein said essentially elliptical cross section has an size which is as small as possible yet sufficient to permit insertion of said electrode structure of said electrode means.

11. A method as described in claim 1 wherein said forming step includes the step of: heating to pliability said second end of said blank thereby causing said second end to collapse forming a second hermetic seal at said second end thereby mounting said second electrode means in said second hermetic seal.

12. A method as described in claim 1 wherein said forming step includes the steps of:
(a) heating to pliability said second end of said blank; and
(b) further pressing said second end of said blank and forming a second hermetic seal at said second end thereby mounting said second electrode means in said second hermetic seal.

13. A method of fabricating a lamp capsule from a tubular blank, said blank having a circular cross section, said lamp capsule having an elongated body, a bulbous midsection heremetically enclosing an interior, and two opposed ends adjacent to said midsection, each of said ends having a press seal formed therein and electrical connection means mounted in said press seal, each electrical connection means protruding into said interior for use in producing light, and a lamp fill in said interior, said method comprising the steps of:
(a) loading a first end of said blank over a first electrical connection means;
(b) sealing a second end of said blank in a sealing head;
(c) heating, at least said first end of said blank to pliability;
(d) pressing said blank and blowing into said second end of said blank thereby simultaneously (1) forming a first press seal at said first end thereby mounting said first electrical connection means in said first press seal; (2) forming said bulbous midsection; and (3) sealing said bulbous midsection between said first press seal, and said sealing head from the exterior;
(e) cyclically pumping inert gas into, and flushing said inert gas out of, said blank to remove contaminants in said blank;
(f) subjecting said blank to a high vacuum and removing residual gases from in said blank;
(g) maintaining said vacuum in said blank and adding said final lamp fill into said blank;
(h) cooling said first press seal end of said blank with liquid nitrogen and freezing out any gas in said blank causing said gas to condense in said bulbous midsection;
(i) advancing said second electrical connection means from said sealing head, and positioning said second electrical connection means in said second end;
(j) adding a final lamp fill into said bulbous midsection; and
(k) forming a second hermetic seal at said second end thereby mounting said second electrical connection means in said second hermetic seal.

14. A method of fabricating a lamp capsule from a tubular blank, said blank having a circular cross section, said lamp capsule having an elongated body, a bulbous midsection hermetically enclosing an interior, and two opposed ends adjacent to said midsection, each of said ends having a press seal formed therein and electrical connection means mounted in said press seal, each electrical connection means protruding into said interior for use in producing light, and a lamp fill in said interior, said method comprising the steps of:
(a) loading a first end of said blank over a first electrical connection means;
(b) sealing a second end of said blank in a sealing head;
(c) heating, at least said first end of said blank to pliability;
(d) pressing said blank and blowing into said second end of said blank thereby simultaneously (1) forming a first press seal at said first end thereby mounting said first electrical connection means in said first press seal; (2) forming said bulbous midsection; and (3) sealing said bulbous midsection between said first press seal, and said sealing head from the exterior;
(e) advancing a hollow needle into the enclosed volume and passing a gas through the needle into the enclosed volume and out around the needle;
(f) withdrawing the hollow needle, and depositing at least one additive into the enclosed volume through the second end;
(g) cyclically pumping inert gas into, and flushing said inert gas out of, said blank to remove contaminants in said blank;
(h) subjecting said blank to a high vacuum and removing residual gases from in said blank;
(i) maintaining said vacuum in said blank and adding said final lamp fill into said blank;
(j) cooling said first press seal end of said blank with liquid nitrogen and freezing out any gas in said blank causing said gas to condense in said bulbous midsection;
(k) advancing said second electrical connection means from said sealing head, and positioning said second electrical connection means in said second end;
(l) adding a final lamp fill into said bulbous midsection; and
(m) forming a second hermetic seal at said second end thereby mounting said second electrical connection means in said second hermetic seal.

* * * * *